United States Patent
Pinkse et al.

(10) Patent No.: US 9,444,632 B2
(45) Date of Patent: Sep. 13, 2016

(54) QUANTUM SECURE DEVICE, SYSTEM AND METHOD FOR VERIFYING CHALLENGE-RESPONSE PAIRS USING A PHYSICALLY UNCLONABLE FUNCTION (PUF)

(71) Applicants: UNIVERSITEIT TWENTE, NB Enschede (NL); TECHNISCHE UNIVERSITEIT EINDHOVEN, AZ Eindhoven (NL)

(72) Inventors: Pepijn W. H. Pinkse, Enschede (NL); Allard P. Mosk, EZ Utrecht (NL); Boris Škorić, EK's Hertogenbosch (NL)

(73) Assignees: UNIVERSITEIT TWENTE, NB Enschede (NL); TECHNISCHE UNIVERSITEIT EINDHOVEN, AZ Eindhoven (NL)

(*) Notice: Subject to any disclaimer, the term of this patent is extended or adjusted under 35 U.S.C. 154(b) by 0 days.

(21) Appl. No.: 14/417,793

(22) PCT Filed: Jul. 30, 2013

(86) PCT No.: PCT/EP2013/002249
§ 371 (c)(1),
(2) Date: Jan. 28, 2015

(87) PCT Pub. No.: WO2014/019678
PCT Pub. Date: Feb. 6, 2014

(65) Prior Publication Data
US 2015/0229482 A1    Aug. 13, 2015

(30) Foreign Application Priority Data
Jul. 30, 2012    (EP) .................................... 12005527

(51) Int. Cl.
H04L 9/32    (2006.01)
H04L 9/08    (2006.01)

(52) U.S. Cl.
CPC ........... H04L 9/3278 (2013.01); H04L 9/0852 (2013.01); H04L 2209/24 (2013.01)

(58) Field of Classification Search
USPC ......... 713/194, 189; 380/28, 44; 372/29.014
See application file for complete search history.

(56) References Cited

U.S. PATENT DOCUMENTS

| 5,933,502 A | 8/1999 | Aucsmith et al. |
| 2006/0095773 A1 | 5/2006 | Itoh et al. |

(Continued)

FOREIGN PATENT DOCUMENTS

| WO | WO 98/28707 A1 | 7/1998 |
| WO | WO 2005/059629 A1 | 6/2005 |
| WO | WO 2007/046018 A1 | 4/2007 |

OTHER PUBLICATIONS

I. M. Vellekoop et al.: "Focusing coherent light through opaque strongly scattering media", Optics Letters, vol. 32, No. 16, pp. 2309-2311 (2007).

(Continued)

Primary Examiner — Jeffrey Pwu
Assistant Examiner — Samuel Ambaye
(74) Attorney, Agent, or Firm — Norman B. Thot

(57) ABSTRACT

A device for verifying at least one challenge-response pair includes a coherent light source configured to emit coherent light. A challenge creating device is configured to create an optical challenge to be sent to a physically unclonable function (PUF). A wavefront shaping device is configured to perform a verification based on an optical response from the physically unclonable function (PUF). A detector is configured to read out a result of the verification performed by the wavefront shaping device. A focusing device is configured to focus light exiting from the wavefront shaping device onto the detector for detection.

18 Claims, 6 Drawing Sheets

(56) References Cited

U.S. PATENT DOCUMENTS

| | | | |
|---|---|---|---|
| 2007/0046018 A1 | 3/2007 | Ochi-Okorie | |
| 2007/0090312 A1 | 4/2007 | Stallinga et al. | |
| 2008/0121708 A1 | 5/2008 | Rhoads et al. | |
| 2008/0231418 A1* | 9/2008 | Ophey | G02B 27/00 340/5.85 |
| 2010/0258708 A1* | 10/2010 | Meyers | G01S 17/89 250/208.1 |

OTHER PUBLICATIONS

I. M. Vellekoop et al.: "Phase control algorithms for focusing light through turbid media", Optics Communications, vol. 281, pp. 3071-3080 (2008).

R. S. Pappu: "Physical One-Way Functions", PhD thesis, MIT, pp. 1-154 (2001).

R. Pappu: "Physical One-Way Functions", Science, vol. 297, pp. 2026-2030 (2002).

B. Gassend et al: "Silicon Physical Random Functions", ACM Conf. on Computer and Communications Security—CCS 2002, pp. 148-160 (2002).

P. Tuyls et al.: "Read-Proof Hardware from Protective Coatings", CHES 2006, LNCS, vol. 4249, pp. 369-383 (2006).

D. Kirovski: "Toward an Automated Verification of Certificates of Authenticity", ACM Conference on Electronic Commerce, pp. 160-169 (2004).

G. Dejean et al.: "Making RFIDs Unique—Radio Frequency Certificates of Authenticity", IEEE Antenna and Propagation Symposium—URSI, pp. 1-4 (2006).

B. Škorić et al.: "Randomized resonators as uniquely identifiable anti-counterfeiting tags", Secure Component and System Identification Workshop, pp. 1-12 (2008).

J. D. R. Buchanan et al.: "'Fingerprinting' documents and packaging", nature, vol. 436, p. 1 (2005).

J. Guajardo et al.: "FPGA Intrinsic PUFs and Their Use for IP Protection", P. Paillier et al.: CHES 2007, LNCS, vol. 4727, pp. 63-80 (2007).

S. S. Kumar et al.: "Extended Abstract: The Butterfly PUF Protecting IP on every FPGA", Host 2008, pp. 67-70 (2008).

C. N. Chong et al.: "Anti-Counterfeiting with a Random Pattern", Securware 2008, pp. 146-153 (2008).

K. Kursawe et al.: "Reconfigurable Physical Unclonable Functions—Enabling Technology for Tamper-Resistant Storage", Host 2009, pp. 22-29 (2009).

B. Škorić: "Quantum Readout of Physical Unclonable Functions", Africacrypt 2010, LNCS 6055, pp. 369-386 (2010).

* cited by examiner a)

b)

c)

US 9,444,632 B2

QUANTUM SECURE DEVICE, SYSTEM AND METHOD FOR VERIFYING CHALLENGE-RESPONSE PAIRS USING A PHYSICALLY UNCLONABLE FUNCTION (PUF)

CROSS REFERENCE TO PRIOR APPLICATIONS

This application is a U.S. National Phase application under 35 U.S.C. §371 of International Application No. PCT/EP2013/002249, filed on Jul. 30, 2013 and which claims benefit to European Patent Application No. 12005527, filed on Jul. 30, 2012. The International Application was published in English on Feb. 6, 2014 as WO 2014/019678 A1 under PCT Article 21(2).

FIELD

The present invention relates to the field of physically unclonable functions (PUFs), in particular to the field of optical PUFs. The present invention is more particularly related to a quantum secure device, a system, and a method for verifying challenge-response pairs (CRPs) using a PUF. Amongst other purposes, the present invention is suitable for use with credit cards and other authentication cards, allowing access to a secret or resource.

BACKGROUND

Secure communication and authorization is a highly important topic these days. Many secure communication and authorization schemes rely on cryptographic systems and methods. In classical cryptography, the mathematically (still not entirely proven) fact is used that some mathematical functions can be calculated without difficulty in one direction, but solving the inverse mathematical problem practically impossible; this would at least require extremely high and time-consuming computational efforts. These computational efforts will, however, suddenly be significantly reduced when the first quantum computers start operation. One is therefore looking for other approaches which are inherently secure. One approach is quantum cryptography which is basically a physical approach relying on the fact that each measurement influences unknown quantum states, and that it is therefore in principle possible to find out about an eavesdropper. Quantum states are, however, rather fragile states, and it is to date hard to prepare and handle them appropriately, in particular over larger distances.

In practical cryptography, a physically unclonable function or PUF [1,2] is a function that is embodied in a physical structure which is easy to evaluate, but which is hard to predict and which is assumed to be physically unclonable because of a strong dependence on uncontrollable aspects of the manufacturing process. PUFs have a unique challenge-response behavior. They are of interest as a means of authentication for these reasons.

A PUF owner should typically prove access to a secret by presenting his PUF to a verifying party. The verifying party sends a signal called challenge to the PUF, and the PUF then creates a unique and hard to predict reply signal called response. This response is supplied back to the verifying party so that it can be verified that the PUF owner actually has authorized access to the secret or resource.

Many PUF-like systems have previously been described. These include: optical PUFs [Pappu, R.: Physical One-Way Functions. PhD thesis, MIT (2001); Pappu, R., Recht, B., Taylor, J., Gershenfeld, N., Physical One-Way Functions, Science 297, pp. 2026-2030 (2002)], delays in integrated circuits [Gassend, B., Clarke, D. E., van Dijk, M., Devadas, S., Silicon physical unknown functions, ACM Conf. on Computer and Communications Security-CCS 2002, November 2002, pp. 148-160 (2002)], dielectric properties of security coatings [Tuyls, P., Schrijen, G. J., Škorić, B., van Geloven, J., Verhaegh, R., Wolters, R., Read-proof hardware from protective coatings, Goubin, L., Matsui, M. (eds.), CHES 2006. LNCS, Vol. 4249, pp. 369-383, Springer, Heidelberg (2006)], two-dimensional fiber-optic configurations [Kirovski, D., Toward an automated verification of certificates of authenticity, ACM Conference on Electronic Commerce, pp. 160-169. ACM, New York (2004)], radiofrequent probing of wire configurations [DeJean, G., Kirovski, D., Radio frequency certificates of authenticity, IEEE Antenna and Propagation Symposium-URSI (2006)] and thin-film resonators [Škorić, B., Bel, T., Blom, A. H. M., de Jong, B. R., Kretschman, H., Nellissen, A. J. M., Randomized resonators as uniquely identifiable anti-counterfeiting tags, Secure Component and System Identification Workshop, Berlin (March 2008)], laser probing of fibers in paper [Buchanan, J. D. R., Cowburn, R. P., Jausovec, A., Petit, D., Seem, P., Xiong, G., Atkinson, D., Fenton, K., Allwood, D.A., Bryan, M. T., Forgery: 'fingerprinting' documents and packaging, Nature, Brief Communications 436, pg. 475 (2005)], startup values of SRAM cells [Guajardo, J., Kumar, S. S., Schrijen, G. J., Tuyls, P., FPGA intrinsic PUFs and their use for IP protection, Paillier, P., Verbauwhede, I. (eds.), CHES 2007, LNCS, Vol. 4727, pp. 63-80, Springer, Heidelberg (2007)], butterfly PUFs [Kumar, S. S., Guajardo, J., Maes, R., Schrijen, G. J., Tuyls, P., The Butterfly PUF: Protecting IP on every FPGA, HOST 2008, pp. 67-70, IEEE, Los Alamitos (2008)], phosphor patterns [Chong, C. N., Jiang, D., Zhang, J., Guo, L., Anti-counterfeiting with a random pattern, SECURWARE 2008, pp. 146-153, IEEE, Los Alamitos (2008)], and phase-change memory states [Kursawe, K., Sadeghi, A.-R., Schellekens, D., Škorić, B., Tuyls, P., Reconfigurable physical unclonable functions, HOST 2009 (2009)].

WO 2007/046018 A1 describes an optical PUF with a combined sensor and display. It applies light which is scattered by a light scattering element comprising a transmissive material which contains randomly distributed light scattering particles which scatter incident light so that a random speckle pattern is created and spread over light detecting elements. The key idea of WO 2007/046018 A1 is to include reflecting picture elements into the device so that it becomes possible to modify applied challenges by activating and switching off the picture elements, thereby also modifying the corresponding response/speckle pattern.

US 2006/0095773 A1 describes an authentication system, a light emitting device, authentication device, and an authentication method which applies an emission-angle dependent light emitting device and a corresponding emission-angle dependent light detector.

WO 2005/059629 A1 describes an optical method and an apparatus for detection of a speckle based PUF and focuses on the definition of criteria employed to determine the size of pixels of a detector that will give rise to detection of all relevant bits (i.e., the pixels are small enough) without too much redundancy (i.e., the pixels are large enough).

US 2008/0121708 A1 describes physical credentials and related methods. Directional albedo of an article is measured and stored. When the article is later presented, it can be confirmed to be the same particular article by re-measuring the albedo function, and checking for correspondence against earlier stored data. The disclosed device and method gains its security from statistics considerations. The disclosed device and method is not, however, inherently secure, in particular not quantum secure.

US 2007/046018 A1 describes an integrated physical unclonable function (PUF) with a combined sensor and display. A specific creation of challenge response pairs is disclosed. Quantum security is not, however, achieved.

WO 98/28707 describes a method and an apparatus for enhancing the integrity of visual authentication. The illumination of an object is modulated for hindering attacks by replaying recorded images. The object is no PUF. Quantum security is no topic.

The security of the verification in all existing PUFs relies on the fact that the validator knows he is probing the properties of a physical entity such as an integrated circuit, a SRAM cell, a phosphor layer, etc. If the PUF owner doesn't trust the validator, the PUF owner will not want to give away his PUF for checking. The best a validator can therefore do is to try to check from a (possibly small) distance, in which case he can be fooled by an intelligent attacker system emulating the PUF. Highly desired for the authentication processes is a secure and practical authentication protocol which does not rely on a trusted remote reader device or on examining the PUF to make sure it is a physical object of the expected size, weight and complexity.

A possible direction was recently described by B. Škorić in a mathematical abstract paper [Škorić, B., Quantum Readout of Physical Unclonable Functions, AFRI-CACRYPT 2010, LNCS 6055, pp. 369-386 (2010)] who suggested a quantum secure readout of a classical PUF that is challenged using a quantum state, and who's response is also a quantum state. The protocol allows for authenticating a QR-PUF remotely without reliance on a trusted remote reader device. The paper by B. Škorić did not suggest a physical implementation and suffers from the fact that its security proof uses (necessarily fragile) quantum states as key element.

SUMMARY

An aspect of the present invention is to provide a secure device, system and method for authentication purposes which can overcome the above mentioned disadvantages. An aspect of the present invention is in particular to provide a secure device, system and method of the aforementioned type that is based on PUFs. An aspect of the present invention is to provide a device, system and method which provides security even in cases in which the properties of the PUF are publicly known and might be emulated.

In an embodiment, the present invention provides a device for verifying at least one challenge-response pair which includes a coherent light source configured to emit coherent light. A challenge creating device is configured to create an optical challenge to be sent to a physically unclonable function (PUF). A wavefront shaping device is configured to perform a verification based on an optical response from the physically unclonable function (PUF). A detector is configured to read out a result of the verification performed by the wavefront shaping device. A focusing device is configured to focus light exiting from the wavefront shaping device onto the detector for detection.

BRIEF DESCRIPTION OF THE DRAWINGS

The present invention is described in greater detail below on the basis of embodiments and of the drawings in which.

DETAILED DESCRIPTION

Figure 1:
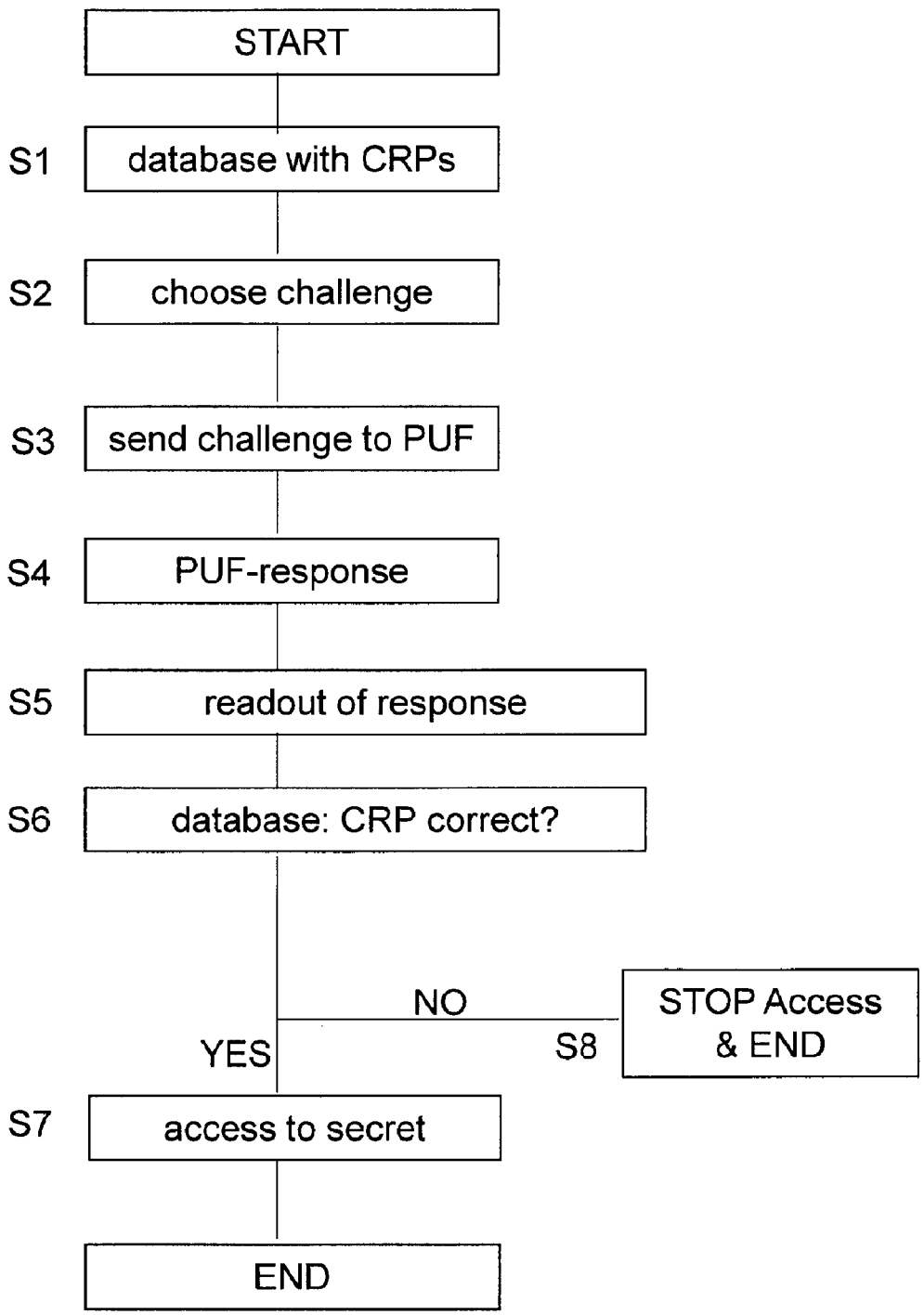
FIG. 1 shows a flowchart of CRP verification according to the prior art.

In an embodiment, the present invention is directed to a device for verifying challenge-response pairs, comprising:
a wave source, in particular a light source;
a challenge creating means for creating a challenge, in particular an optical challenge, to be sent to a PUF, in particular when receiving waves emitted from the wave source;
a response transformation means for verifying a response from a PUF; and
a detector for reading out the result of the verification carried out by the response transformation means.

In an embodiment, the present invention provides a device for verifying challenge-response pairs which presumes that challenge-response pairs have been previously defined (an example for such a definition of challenge-response pairs will be addressed below). The device is applicable for verifying challenge-response pairs, i.e., to make sure that a challenge-response pair is valid.

The device for verifying challenge-response pairs comprises a wave source, in particular a light source. In general, there exist several different types of wave sources that can in principle be used in the present invention. The wave source emits waves that also have particle character (wave-particle-dualism). The present invention uses both the wave characteristics as well as the particle characteristics in its realization. When assuming that the PUF interaction includes a scattering process, such wave types are furthermore suited that allow for such a unique scattering interaction in the PUF. As already mentioned above, a type of a wave source according to the present invention is therefore a light source. However, several other examples of suited wave sources exist: sound waves, in particular ultra sound waves, plasmons, plasmon-polaritons, electrons, holes, or even ions or elementary particles.

In an embodiment of the present invention, the wave source can, for example, be a coherent light source. The term "coherent light" here means light with a narrow enough bandwidth to create a high-contrast-speckle pattern, and not "coherent" in the quantum optical sense where it is also used to describe the statistics. The coherent light source can, for example, be a laser. The light source can, for example, be operated to emit weak light. In an embodiment, the coherent light source can, for example, be a laser adapted to emit pulses of only a limited number of photons. It is not necessarily the case that just one photon is emitted in one laser pulse, however, this is also a possible embodiment. In an embodiment, one laser pulse can, for example, comprise approximately up to 250 photons. In an embodiment, a laser diode can, for example, be applied as the coherent light source. Other laser types can also be used. In principle, there exist no limitations for the applied laser frequencies; however, it makes sense to choose laser frequencies that allow for a good interaction with a selected optical PUF. The applied frequency/frequencies can, for example, be in the visible-infrared part of the spectrum.

The device for verifying challenge-response pairs comprises a challenge creating means for creating a challenge, in particular when receiving waves from a wave source. In most cases, the wave source and the challenge creating means are provided as separate means. These means can still be combined or integrated with one another. In an embodiment, it is even possible that the wave source as such also acts as the challenge creating means. In the letter case, the challenge creating means does not (separately) receive waves from the wave source. The challenge must be sent to a PUF means for interacting with the challenge, thereby creating a response to the challenge. In this manner, a challenge presented to the PUF will lead to a respective response from the PUF, thereby generating a unique challenge-response pair. In the known systems for verifying challenge-response pairs, there is provided a detector for directly or indirectly reading out the thus created response from the PUF. In other words, the response is in principle analyzed in detail, and the response can be fully characterized due to this analysis. A comparison of the actual response generated from the PUF is then compared to the response theoretically expected when presenting a known challenge to the PUF. If the actual response fits to the expected theoretical response, the challenge-response pair is verified, and, for example, access to a secret or resource is allowed.

According to the present invention, the response from the PUF is not, however, fully characterized with the response transformation means; there is no direct or indirect readout, and no full description of the response because of a measurement of the response signal itself. In contrast thereto, the present invention applies a response transformation means for verifying the response from the PUF which is no readout and which does not necessarily allow for a full description of the response generated by the PUF. The response transformation means can, for example, act on the response signal in the manner of a transformation or conversion, for example, in the manner of a reversion or inversion or projection. It transforms or converts the response signal so that a detection for reading out the result of the verification becomes possible. It is noted that a detection reading out the result of the verification is generally not possible without prior application of the response transformation means. This becomes important for quantum security (see below).

The response transformation means is suited for verifying the response, and this implies that its specific configuration must be set in accordance with a known/preselected challenge. The response transformation means is therefore no means that interacts in a completely identical manner with all possibly presented signals/responses, but its setting must be chosen depending on the applied challenge sent out by the challenge creating means. The response transformation means can then act on the presented response signal in a challenge-response-pair specific manner that leads to an output from the response transformation means. This output can then be detected (or possibly in fact not detected) in order to judge whether a challenge-response pair was valid or not. If it was valid, then the correct PUF was presented to the device for verifying challenge-response pairs.

In an embodiment of the present invention, the action of the response transformation means can, for example, be of the type of a reversion or inversion or projection and basically reverses or inverts or projects a response signal. The effect of the inversion or reversion or projection is that, after the reversion or inversion or projection, a readout of the result of the verification procedure becomes possible. A reversion or inversion acting on the response signal brings the signal back into an original condition, it is, however, normally not the case that the signal outputted by the response transformation means is identical to an original state that was previously sent to the challenge creating means. A projection can project a response onto a state that is well suited for later measurement. The original condition re-established or the characteristics of the state resulting from the projection by action the response transformation means can, for example, be a common phase of the wavefront in all channels, common amplitude or common polarization, etc. These common characteristics can be requirements that must be fulfilled for successfully carrying out a later measurement/detection, in particular with respect to a signal strength needed when only a few interaction particles are used for verification in order to provide quantum security.

In an embodiment of the present invention, the nature of the response transformation means can, for example, be of the same type as that of the challenge creating means. This means that the physical interactions carried out using the challenge creating means on the one hand and the response transformation means on the other hand are basically the same; however, it is not required that the detailed interaction is identical in all aspects.

In an embodiment of the present invention, the challenge creating means and/or the response transformation means are/is, for example, adapted to carry out wavefront shaping on provided light. Wavefront shaping is a technique that was recently developed [Vellekoop, I. M., Mosk, A. P., Focusing coherent light through opaque strongly scattering media, Optics Lett. 32, No. 16, pp. 2309-2311 (2007); Vellekoop, I. M., Mosk, A. P., Phase control algorithms for focusing light through turbid media, Optics Communications 281, pp. 3071-3080 (2008)], but which, until today, has never been applied in connection with challenge-response pairs and PUFs. According to wavefront shaping techniques, it was, for example, demonstrated to focus coherent light through disordered scattering media by the construction of wavefronts that invert diffusion of light. More concretely, wavefront shaping allows for the construction of input wavefronts that exactly compensate the phase delays of paths through the randomly scattering medium so that the light leaving the medium constructively interferes on one spot, forming a focus. A concrete example for a challenge creating means and/or a response transformation means are spatial light modulators (SLMs) for manipulating the phase and/or amplitude of light. In an embodiment of the present invention, two regions of the same SLM can be used to embody the challenge creating means and the response transformation means, respectively.

In the device for verifying challenge-response pairs, the challenge creating means as well as the response transformation means act on a provided wave/waves, in particular light, in a manner depending on the properties and definition of the challenge-response pair having been chosen for verification purposes. The claimed device then comprises a detector for reading out the result of the verification carried out by the response verification means. It is once again stressed that this readout is no readout of the response signal itself, but is a detection of the signal generated by the response transformation means. The device for verifying challenge-response pairs according to the present invention therefore for the first time provides an indirect readout of the response generated by the applied PUF, wherein it is not necessary to fully characterize the response. This can significantly facilitate systems for verifying challenge-response pairs.

The above described device for verifying challenge-response pairs furthermore offers a possibility to implement a quantum secure device for verifying challenge-response pairs. The number of interaction particles, in particular photons, in the challenge is advantageously less than the number of parameters needed to fully describe the setting of the challenge creating means. In each case, a challenge-response pair can be described mathematically in a Hilbert space of appropriate size. A very simplified and comprehensive explanation of this quantum security is as follows. Assume that an eavesdropper wants to copy a challenge (or response) signal. The eavesdropper must then ideally find out about all characteristics/settings of the challenge (description in Hilbert space of appropriate size). This must be done by a measurement. However, in order to classically determine one characteristics or setting of the challenge, at least one interaction particle must be measured. The measurement of just one interaction particle can deliver the information about just one characteristic or setting. Due to the wave nature of the interaction particle, it is possible, however, to code more than one characteristics or settings in the quantum mechanical state of just one interaction particle. However, it is absolutely impossible to completely read-out or reconstruct all characteristics or settings from measuring just one interaction particle. One might say that the quantum mechanical extent of information carried by an interaction particle can be much higher than the classical extent of information that can be extracted from the interaction particle by a measurement. The above described quantum security can be achieved independently from the concrete physical nature/definition of the challenge response pair and the concrete physical nature of the interaction particles. The fascinating device-inherent quantum security is a very general finding.

In an embodiment of the present invention, the challenge or/and a response is/are, for example, defined by a physical property of photons, in particular phase information, amplitude information, polarization information, frequency information, spatial information and/or time information of photon(s). The challenge or/and response can, for example, be described by a spatial distribution, in particular a two-dimensional distribution, of a physical property of photons, a frequency distribution of a physical property of photons and/or a time distribution of a physical property of photons. The physical property or properties can be selected from the properties listed above. In a suited Hilbert space, the description of the challenge-response pair is complete in that sense that all parameters for defining the challenge and the response are known/can be set. Giving a more illustrative example, the different channels in a spatial light modulator can be used to characterize a challenge by defining the setting for the challenge creating means. If, however, a coherent light pulse is provided to the challenge creating means, which contains less photons than the number of parameters needed to fully describe the setting of the challenge creating means (for example, the number of channels in a spatial light modulator), it then becomes physically impossible for an eavesdropper to read out the challenge completely, look up a respective response, and send the response back to the response transformation means. The full description of the wavefront needs more information than contained in a measurement of the few photon pulse. In other words, the number of photons (or more generally: interaction particles) is just too small for completely characterizing the challenge and thus copying the challenge for emulation purposes.

Though the security of the described device for verifying challenge-response pairs relies on the rules of quantum mechanics (more precisely, on the extent of quantum mechanical information), the device itself does not suffer from the principle problem of fragile quantum mechanical states. The claimed device could in principle also work with just one photon emitted from a the light source and sent to the challenge creating means and so on. A photon can also be temporally shaped. However, using just one single photon is not necessary to provide quantum security. More than one photon can, for example, be used. A typical number of photons in the optical challenge can be approximately 250 photons, in combination with for example 1000 channels in the challenge creating means.

As already mentioned above, a challenge-response pair according to the present invention can be described by a spatial distribution, in particular a two-dimensional distribution, of a physical property of photons. Alternatively, a challenge-response pair according to the present invention can be described by a time distribution or frequency distribution of a physical property of photons. Once again, such a physical property of a photon can then be phase information, amplitude information, polarization information, frequency information, time or spatial information.

The principle of the present invention is broadly applicable to devices for verifying challenge-response pairs. It must furthermore be noted that wavefront shaping techniques have been applied for devices for verifying challenge-response pairs for the first time.

In an embodiment of the present invention, a focusing means is provided for focusing waves, in particular light, onto the detector for detection. The focusing means can, for example, be provided between the response transformation means and the detector. The focusing means can, for example, be a focusing lens. Alternatively, the response transformation means can be adapted to also act as the focusing means; no additional focusing means for focusing waves onto the detector is then needed. When wavefront shaping techniques are, for example, applied, in particular in the response transformation means, the focusing means allows for focusing even extremely weak light pulses to a focusing point, since the response transformation means can act on the response so that the phases of all photons coincide which is a prerequisite for focusing. The problem is even more severe, since photon losses during PUF interaction inevitably will occur. Focusing in principle allows for detection applying optical detection methods well established in the art.

In an embodiment of the present invention, the spatial detection range of the detector can, for example, be point-like or/and the detector can be adapted to carry out single photon counting. These features can, for example, be combined with the provision of a focusing means as mentioned above. The sole thing that is detected by a detector which is point-like is the number of photons or light energy. The detector then does not gain any information about a spatial distribution of photons arriving at the detector. In an embodiment, the detector can, for example, be an avalanche photo diode (APD). It is in principle also possible to apply a detector which is not point-like, such as, for example, a charge-coupled device (CCD).

In an embodiment of the present invention, the device for verifying challenge-response pairs can, for example, be adapted so that a positive result for verification is distinguished from a negative result for verification based on a preselected number of photons detected/detectable in the detector for one challenge-response pair. It is, for example, possible to define a threshold number of photons (or more general: interaction particles), the detection of which indicates that the challenge-response pair was valid. This is possible because the number of photons (interaction particles) arriving at the detector can be estimated in advance, and in general the Poisson distribution of photons (interaction particles) arriving at the detector is known.

In an embodiment, the present invention is directed to a system comprising the device for verifying challenge-response pairs as described in detail above and a PUF means. The PUF means interacts with the challenge, thereby creating a response to the optical challenge.

In an embodiment of the present invention, the PUF means can, for example, be an optical PUF. The PUF means can be realized in different manners. The PUF means can in particular act on the basis of light scattering, either in transmission or in reflection operation mode. The PUF means can, for example, be a pigment such as ZnO or $TiO_2$ provided on glass, or more stably in glass ceramics (glass containing nanoparticles) or in PMMA (like a DVD), or ceramics themselves. Another example is biologic material which has the potential to authenticate people by the unique properties of their body. Such unique biometric data can, for example, be teeth, bones or even parts of the human eye. These materials fulfill a general requirement for PUF interaction, namely, that the material of the PUF/the scattering media included in the PUF have a scattering mean-free path which is short and well controlled. A rough surface alone cannot be used as a PUF.

In an embodiment, the present invention provides a method for verifying challenge-response pairs. This method comprises the following steps:
  emitting a wave, in particular light;
  creating a challenge, in particular an optical challenge, in particular by directing the emitted wave onto a challenge creating means;
  sending the challenge to a PUF means, thereby creating a response, in particular an optical response, to the challenge;
  verifying the response by directing the response onto a response transformation means;
  reading out the result of verification carried out by the response transformation means with a detector.

The method for verifying challenge-response pairs corresponds to the above described device and system for verifying challenge-response pairs. In particular, the method for verifying challenge-response pairs can be executed applying the system for verifying challenge-response pairs as described in detail above. The wording applied in the claimed method for verifying challenge-response pairs also corresponds to the wording used for describing the system for verifying challenge-response pairs. The interpretation and specific embodiments described by the respective wording are therefore also identical.

Similar to the system for verifying challenge-response pairs, the method for verifying challenge-response pairs differs from the known prior art in the step of verifying the response by directing the response onto a response transformation means, and further in the step of reading out the result of verification carried out by the response verification means (not the response itself) with a detector.

The above described method once again allows for quantum secure verification of challenge-response pairs. In an embodiment, the number of interaction particles, in particular photons, in the challenge can, for example, be smaller than the number of parameters needed to fully describe the setting of the challenge creating means. The full description of the wavefront once again needs more information than contained in a measurement of a single pulse of interaction particles. It is therefore impossible for an eavesdropper to read out the challenge in order to emulate a PUF. The presence of a real physical entity can therefore be securely distinguished from an emulation of the PUF.

In an embodiment of the present invention, the step of reading out the verification result can, for example, comprise the step of interaction particle counting, in particular photon counting. It is in particular possible to define a threshold number of interaction particles, in particular photons, that, when detected, will be regarded as a positive verification result.

In an embodiment of the present invention, it is also possible that some or all of the above mentioned method steps are carried out repeatedly. A repetition of method steps may quickly enhance security of the claimed method even more due to grounds of statistics. The sequence of repeated verifications may include spoof challenges-response pairs that should, for the correct PUF, produce a negative verification result, thereby foiling attacks that always produce a positive result by sending signals of any kind to bypass the verification device.

As already mentioned above, the device, system and method for verifying challenge-response pairs presumes a predefinition of these pairs. In principle, the person skilled in the art will understand from the basic ideas of the present invention how such a predefinition can be carried out. An explicit example will, however, be provided below which is in particular well suited for use with optical PUFs.

The example device for defining challenge-response pairs is based on an interferometric setup, the device comprising:
  a wave source, in particular light source;
  a detector adapted to detect a speckle pattern;
  wherein the device is configured so that waves from the light source can reach the detector along two different paths, thereby realizing an interferometric setup;
  the first path comprising the following elements:
    a challenge creating means for creating a challenge, in particular an optical challenge, to be sent to a PUF, in particular when receiving signals emitted from the wave source;
    a response transformation means for verifying a response from a PUF; and
  one of the paths, in particular the second path, comprising means to vary its path length.

The above device for defining challenge-response pairs partly comprises elements of the above described device for verifying challenge-response pairs. In particular, the elements of the first path (challenge creating means and response transformation means) are identical. In the device for defining challenge-response pairs, however, at least one of the paths, in particular the second path, comprises means to vary its path length, and therefore an interferometric setup is realized. Dividing waves, in particular light, into two parts can be realized with known techniques, for example, by using beam splitters. The interferometric setup allows, for example, for the definition of challenge response pairs based on phase information, for example, phase information about a shaped light front. The phase setting for the response transformation means can be determined for a pre-selected challenge. It must be noted, however, that a phase-shifting interferometric setup is not the only possibility to determine necessary phase information.

The wave source is a rather strong wave source—contrary to the wave source advantageously applied in the device for verifying challenge-response pairs. The physical device embodying the wave source can, however, still be identical. When applied in the system for defining challenge-response pairs, high or full power of the wave source can be applied, while the wave source can be dimmed and chopped when using the wave source in the device for verifying challenge-response pairs.

The detector of the system for defining challenge-response pairs is adapted to detect a speckle pattern. In other words, the detector allows for a two-dimensional resolution of the detected signals. This requirement is, for example, fulfilled by a CCD.

According to the example, the challenge creating means and the response transformation means can be SLMs for manipulating the phase and/or amplitude of light.

The device for defining challenge-response pairs furthermore comprises a phase calculating means adapted to calculate the phase of all detectable or detected speckles. This phase calculating means can, for example, comprise a software routine implemented in a computer.

A system for defining challenge-response pairs can be operated by the following method:

A method for defining challenge-response pairs using the system for defining challenge-response pairs based on an interferometric setup, wherein the challenge creating means and the response transformation means are adapted to manipulate the phase of incident waves, comprising the following steps:
  choosing a configuration for the challenge creating means, thereby setting a challenge;
  setting the response transformation means to zero;
  emitting signals from the wave source to the interferometric setup;
  varying the path length of one of the paths, in particular that of the second path;
  detecting speckle patterns for each of the varied path lengths;
  calculating the phase of the wavefront emitted from the PUF based on the measurement results for the speckle patterns;
  setting the configuration of the response transformation means such that its action on the response emitted from the PUF is that of a conjugate phase.

Setting the response transformation means to zero as mentioned above means that the response transformation means does not actively manipulate the phase of light incident to the response transformation means. It is, however, possible that a phase shift that is equal in all channels of the response transformation means can occur.

The steps of detecting a speckle pattern and varying the path length of one of the paths, in particular that of the second path, are repeated several times. The path length of the second path can, for example, be varied for pi in several, quasi continuous steps, for example, in 50 steps. There also exist techniques, however, which do not require the repetition of steps in order to vary path lengths in order to find out about the phase. Instead, there also exist one-shot techniques, according to which several phase constellations are simultaneously detected, allowing for a calculation of the respective phase to be set in the response transformation means.

As mentioned above, the configuration of the response transformation means is set so that its action on the response/wavefront emitted from the PUF is that of a conjugate phase. In other words, the response transformation means has the effect to bring the phase of the light scattered from the PUF back into phase. It is noted that the conjugate phase to which action the response transformation means is set is of course not the conjugate phase to the setting of the challenge creating means.

As a further example, the method for defining challenge-response pairs can further comprise a verification step indicating that the determined setting of the response transformation means (7) is correct.

Exemplarily, this verification step can comprise the following steps:
  blocking the second path;
  replacing the detector adapted to detect a speckle pattern with a point-like detector or/and a detector adapted to carry out single interaction particle (photon) counting;
  dimming the wave source;
  focusing the wave exiting from the first path; and
  detecting the focused wave.

The basic method steps as well as the additional method steps can be carried out repeatedly for different settings of the challenge creating means, thereby defining a plurality of challenge-response pairs.

The method for defining challenge-response pairs can, for example, further comprise the following step:
  calculating a threshold number of interaction particles, in particular photons, that shall be at least detected with the chosen experimental setup when a valid challenge-response pair is used in combination with a correct PUF.

This kind of calculation is based on pure statistics and the threshold number can be calculated without any problems when the relevant method steps are repeated sufficiently often in order to fulfill statistics requirements. In this connection, it is also possible to estimate the values of false positive and false negative responses detecting the focused light.

The present invention will be more fully understood by referring to the accompanying drawings.

FIG. 1 illustrates a CRP verification according to the prior art in the form of a flowchart which depicts principle method steps in CRP verification procedures. At the beginning, in method step S1, a database with CRPs is provided. The CRPs of the database have been previously defined; they have been measured, for example, using an appropriate experimental setup. According to method step S2, a challenge C out of the CRP database is chosen. The challenge is sent in step S3 to the PUF. In step S4, the PUF answers with a specific PUF-response, and in step S5, the response from the PUF is read out. In method step S6, it is then judged whether the PUF response is identical with the theoretic response found in the database for the chosen challenge. If the CRP is correct, then in step S7, access to a secret is given. Otherwise, in step S8, the access procedure to the secret is stopped and the procedure ends.

Figure 2:
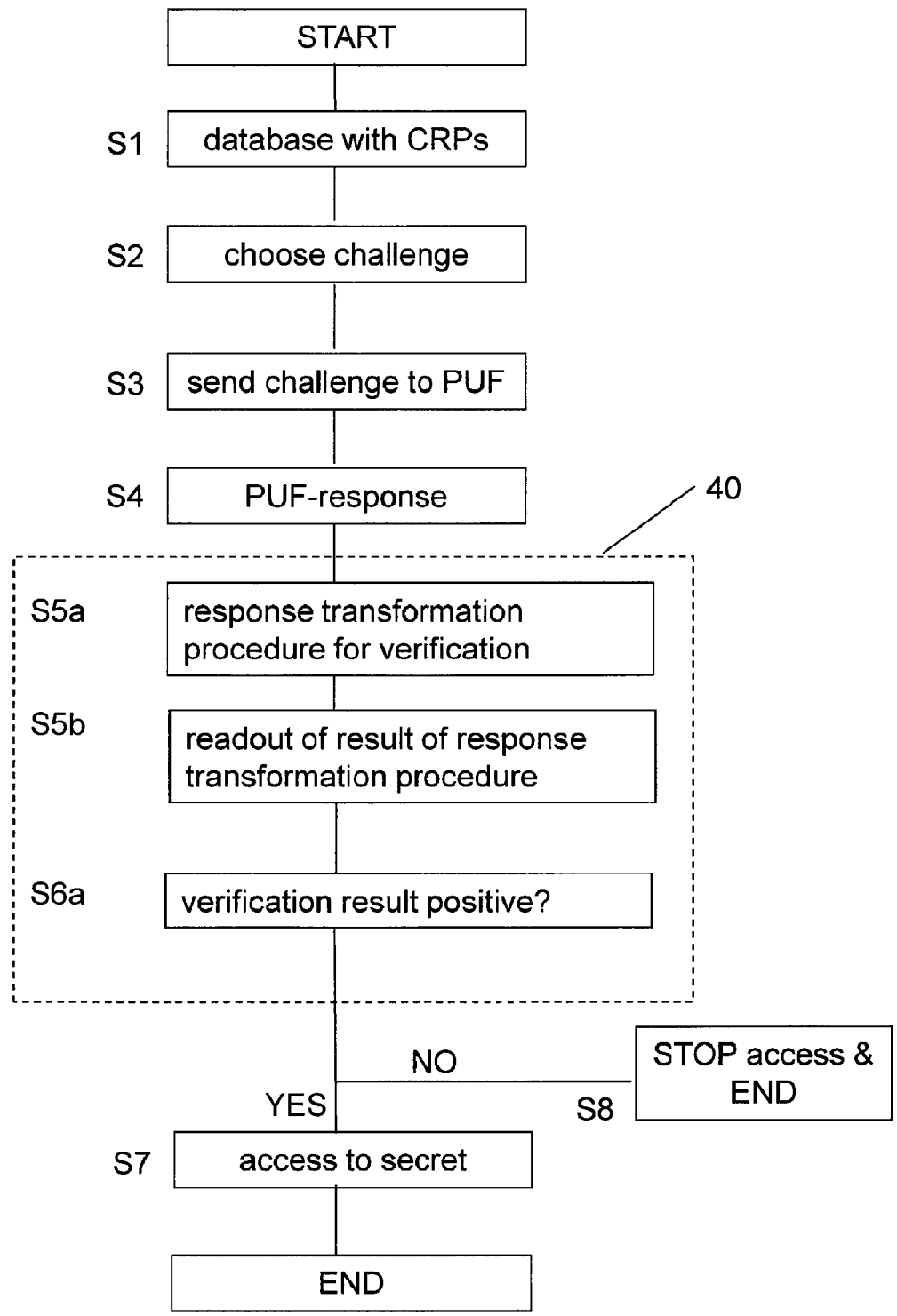
FIG. 2 shows a flowchart illustrating CRP verification according to the present invention in a schematic manner.

FIG. 2 depicts a flowchart showing a CRP verification process according to the present invention. In order to stress the differences to the known CRP verification procedure depicted in FIG. 1, a box 40 highlights the differences of the present invention. Method steps S1 to S4 until the PUF response are in principle identical to the steps of the known CRP verification procedures. However, a response provided by the PUF is then not read out directly or indirectly, and the PUF response is not characterized (no measurement).

Instead, in method step S5a, a response transformation procedure for verification is carried out. In step S5b, the result of this response transformation procedure is read out. In step S6a, it is judged whether the verification result was positive. If this is the case, then, in step S7, access to the secret is allowed. If the verification result was not positive, the access to the secret is stopped and the procedure ends. The replacement of response readout by a response transformation procedure for verification and readout of the result of this transformation procedure in principle allows for a quantum secure verification of challenge response pairs. With the help of the response transformation procedure for verification and respective readout of the transformation procedure result, it becomes possible to use quantum mechanical information included in the CRP for verification purposes, wherein the extent of quantum mechanical information is larger than any classical information that can be gained by a measurement process of the respective challenge or response.

Optical challenge response pairs interacting with an optical PUF will be focused on below. The skilled person will understand, however, that the general principles of the optics realization can be transferred to other kinds of realization.

Figure 3:
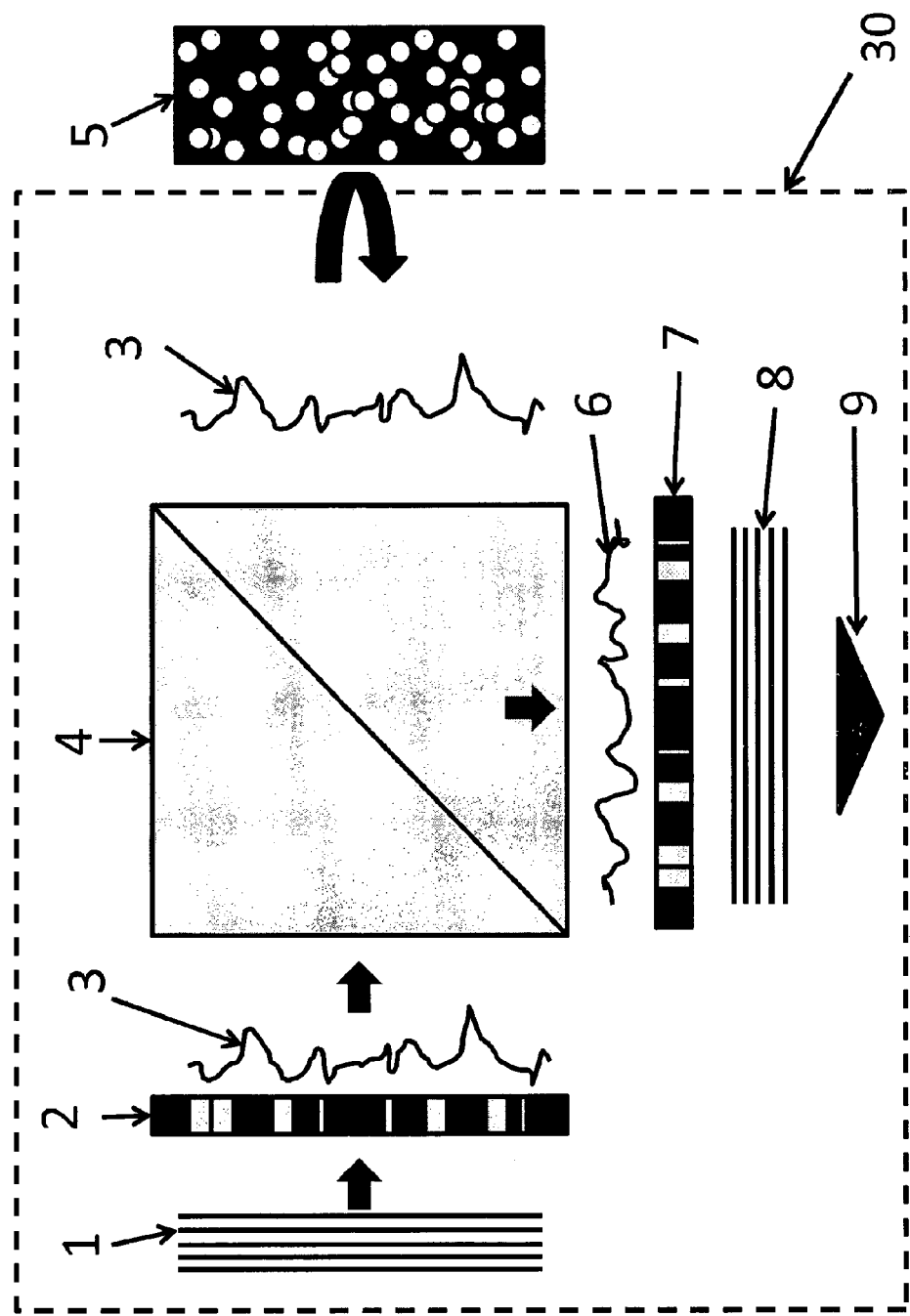
FIG. 3 shows a schematic setup for PUF verification according to an embodiment of the present invention.

FIG. 3 shows a schematic setup for PUF verification. The system depicted in FIG. 3 comprises two main parts, the verifier 30 and the key or PUF 5. The PUF 5 is presented to the verifier 30 in order to obtain access to a secret. It can, for example, be included in a credit card or in other cards applied in authorization and/or authentication procedures.

The verifier 30 is built up as follows. A coherent light source (not shown) emits laser pulses 1 having a flat wavefront in the depicted example. The laser pulse is comparatively weak and can, for example, comprise about 250 photons. The laser pulse 1 with the flat wavefront is sent to the challenge creating means 2 which is in the present case embodied by an SLM. The SLM 2 acts on the phase of the flat wavefront and shapes the wavefront into a random wavefront. The setting of each channel in the SLM 2 can, for example, either be zero or pi. A specific setting of the SLM 2 always results in the same shaped wavefront. The pulse with the random wavefront represents the challenge. In the present example, the SLM 2 has 1000 channels. These 1000 channels are provided in a grid-like manner, and the action of each channel can be individually set. The challenge 3 having passed the SLM 2 carries all information about the setting of the SLM 2, however, it is impossible to read out all of this information when detecting the challenge 3, because the challenge 3 comprises just 250 photons in the selected example, which is significantly less than the 1000 parameters needed to fully describe the setting of the SLM 2. It must be born in mind that with the present experimental setup, quantum effects play an important role. In particular, preparing a challenge just comprising one photon carrying the quantum mechanical information about all 1000 channels of the SLM 2 in principle is possible. However, it is preferred that the challenge contains more than one photon in average in order to have at least one detector click in case of a good CRP.

The number of channels in the SLM 2 is related to the number of controlled channels (K) in the PUF. In the present case, K is roughly the number of speckles, and the number of pixels in the challenge-forming SLM 2 must be chosen at least as high as K. In this context, a quantum security parameter S=K/n can be defined, wherein n denotes the number of photons in the challenge (or more general: the number of interaction particles). This parameter can, for example, be in the range $1 < S \leq K$.

The challenge 3 passes through a beam splitter 4 and is incident on the PUF 5 where it is scattered back to the beam splitter 4. It is noted that a PUF 5 can of course also work in a transmission mode, not just in a reflection mode. The wavefront that is scattered back from the PUF 5 represents the response 6. For ease of depiction, the response 6 is just depicted after having passed the beam splitter 4, but of course it is also present between the PUF 5 and the beam splitter 4. The wavefront of response 6 is specially shaped due to the interaction with the PUF 5. The response 6 is then sent to the SLM 7 which acts as the response transformation means. The setting of the SLM 7 is chosen based on knowledge of the setting of SLM 2, in particular, these two settings are normally neither identical, nor is the setting of the response transformation means 7 the conjugate setting to that of SLM 2. The setting of SLM 7 is such that it instead conjugates the phase of response 6. Having passed SLM 7, the wavefront of the pulse 8 has been shaped so that the phases in the pulse again coincide- the wavefront is thus again flat. This allows, for example, the pulse 8 to be focused so that it can be easily detected with a detector 9. The detector 9 is preferably adapted to carry out single photon counting. This can, for example, be done using an APD. On the other hand, if it was not, the correct PUF 5 that was presented to the verifier 30, the action of the response transformation means 7 on the presented response 6 will still be to generate a wavefront with a random shape. There is no phase coincidence along this wavefront. It is therefore not possible to focus such a wavefront to a single point again, and consequently, the applied single photon counting detector 9 will not count a sufficient number of photons.

The experimental setup shown in FIG. 3 therefore allows two different goals to be reached. On the one hand, when a physical entity is presented as a PUF 5 to the verifier 30, it can be determined whether the correct PUF 5 is presented. On the other hand, the verifier 30 cannot be fooled by an emulation device, since it is physically impossible to read out the presented challenge 3, because the extent of information included in the challenge 3 is so high that it cannot be read out completely by performing a measurement (the number of photons in the challenge is smaller than the number of channels in the challenge creating means). The experimental setup depicted in FIG. 3 is therefore quantum secure.

One could of course consider how to attack the security of the present invention. However, such attacks will be hardly successful. It is for example possible that an attacker can send much more light into the inventive device than the device normally uses. Then several photons might be counted in the detector without use of the correct PUF. This scenario is simply prevented by adding additional "background" detectors to the inventive device which measure (for example, via a beam splitter) how much light was incident on SLM 2 or, better, how much light fell outside of the pinhole/the device.

The present invention is also secure against holographic attacks. Without going into deep detail, these kind of attacks can be prevented by limiting the coherence length of the light source to a few times the mean free path of the PUF, i.e., a few 10 micrometers in the explicitly described embodiment of FIG. 3.

Figure 4:
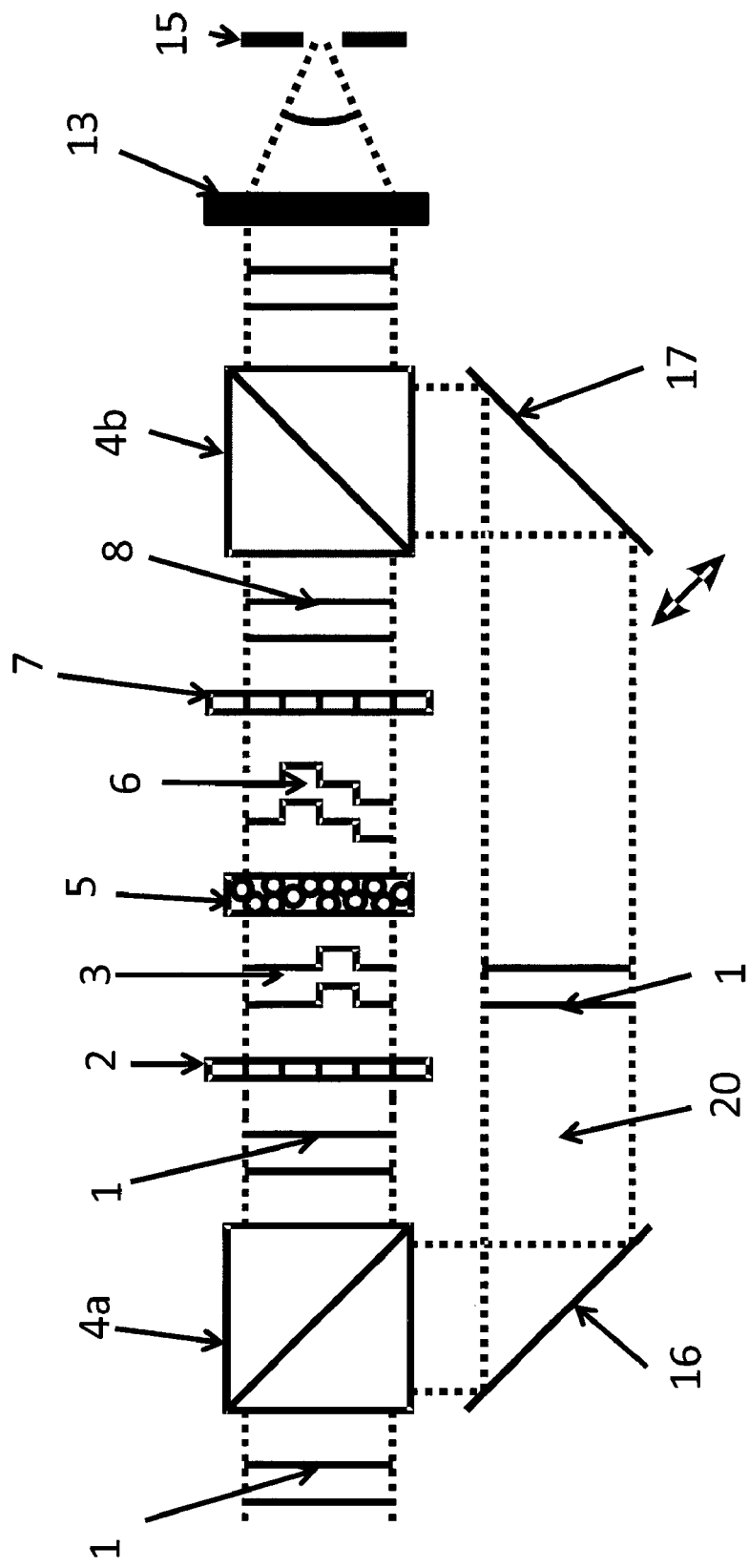
FIG. 4 shows a schematic experimental setup for defining valid CRPs.

FIG. 4 shows a schematic experimental setup for defining valid CRPs. The light from a diode laser (not shown) enters a beam splitter 4a and is divided into two different light paths. The first light path is shown on the upper half in FIG. 4, and the second light path 20 is used as a reference light path 20 is found on the bottom half in FIG. 4. In the first light path, there are provided once again an SLM 2, a PUF 5 and an SLM 7. The SLM 2 acts as a challenge creating means, and the SLM 7 acts as a response transformation means. In the depicted example, the PUF 5 interacts with the presented light in a transmissive mode. However, the transmission can of course be replaced by a reflection. The light entering the reference light path 20 is reflected by minor 16 and once again by mirror 17. It then enters another beam splitter 4*b*, in which light from the two light paths is recombined and sent to a detector 13. Reference signs 1, 3, 6 and 8 depict in a schematic manner the wavefront shape due to interaction with SLM 2, PUF 5 and SLM 7. In the depicted example, the PUF 5 is represented as a layer of ZnO on glass.

The action of the experimental setup depicted in FIG. 4 is as follows. Before the verification can start, the PUF 5 must be characterized once. To this end, a challenge is chosen with wavefront SLM 2. In the presented example, the challenges are binary phase challenges with a phase of 0 or pi, respectively. The amplitude and phase of the wavefront coming back from the PUF 5 is measured with an interferometric method and amounts of light from a CW diode laser are sampled (coherent OBIS 785 nm LX). SLM 7 is set to act as a minor with a flat phase. By moving the mirror 17 in the reference arm 20 with a piezo, the optical path length of the reference arm 20 can be varied, effectively changing its phase by pi. This results in the speckle pattern of the CCD 13 to show a cosine behavior as the function of the position of the minor 17 in the reference arm 20, allowing to determine the phase of all the visible speckles. The information on the response wavefront is used to null the phase of a light from the PUF 5 by applying the conjugate phase with SLM 7. It is verified that as a result, all speckles on the CCD 13 now vary in phase with the piezo motion.

The reference arm 20 of the interferometer is next blocked, and with a flip minor, the CCD 13 is now replaced with a lens focusing the flat-wave front speckle pattern onto a camera 15 in the focal plane of the lens. It is here observed that about 50% of the power is in the central spot. For the final demonstration, the CW laser diode light is dimmed and chopped in 500 ns long weak pulses. The CCD camera is replaced by a small pinhole and a single-photon counting Avalanche photodiode APD behind the pinhole.

Figure 5:
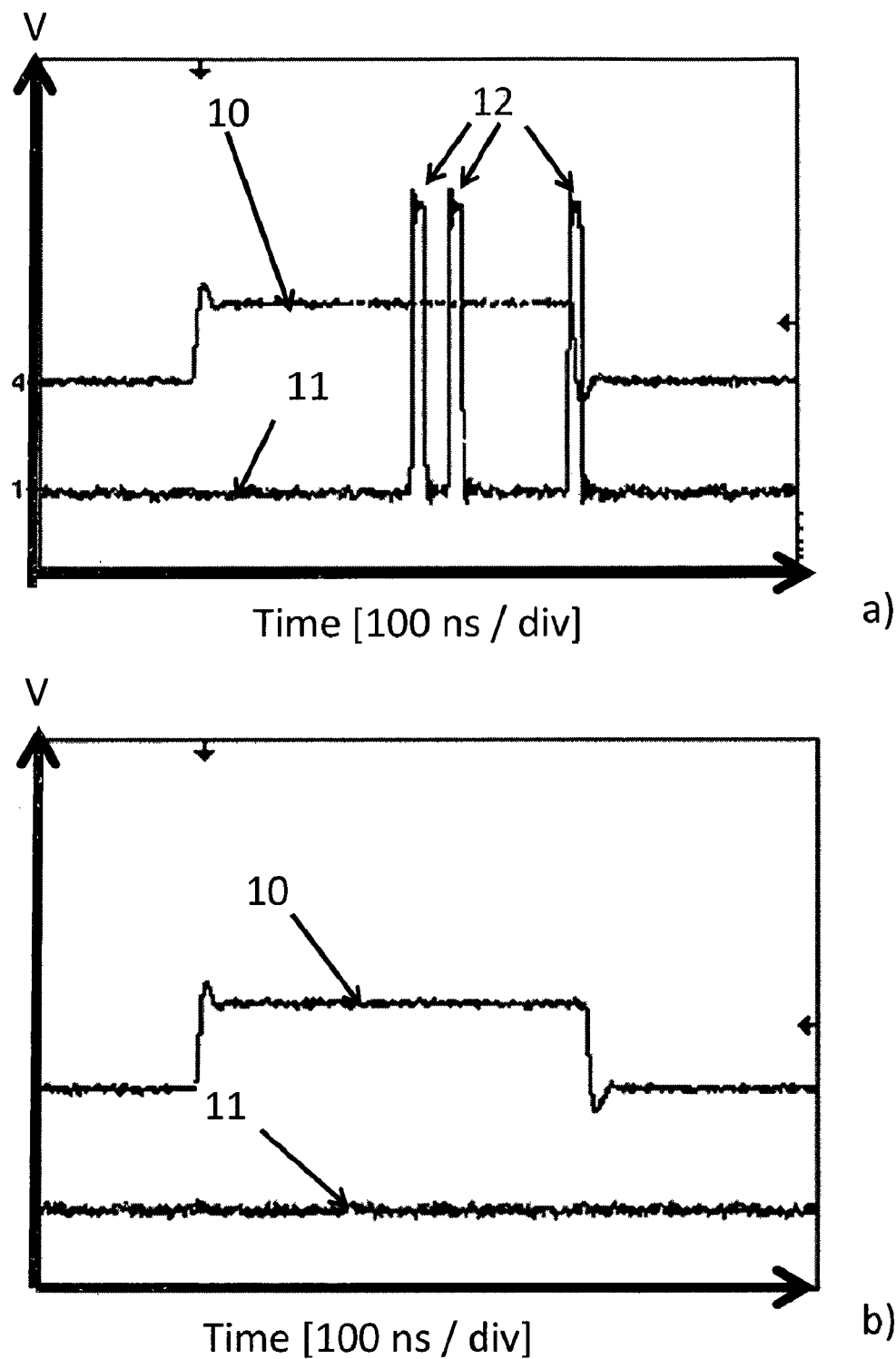
FIG. 5 exemplarily shows detection results gained with an APD for a) a correct challenge-response pair (correct PUF) and b) a wrong challenge-response pair (wrong PUF)

An exemplary measurement result is depicted in FIG. 5. In FIG. 5*a*), the detected voltage V detected with the APD is depicted. The time interval of interest is determined using a time gate signal 10. The detection signal 11 comprises three high and well-defined peaks 12, the APD therefore counts three photons in the time interval of interest.

In the case depicted in FIG. 5*a*), a correct challenge response pair (the correct PUF) was applied, and three photons were then counted. In contrast thereto, the result depicted in FIG. 5*b*) corresponds to a case in which the challenge response pair was not valid (the wrong PUF was presented), for example, in the present case, for demonstration purposes, the settings of the challenge creating means (SLM 2) and the response transformation means (SLM 7) remained unchanged, but another part of PUF was chosen, thus presenting a "false" PUF. In this case, no photon could be detected with the APD.

Repeating the measurement 1000 times for an excitation power of approximately 250 photons in the challenge wavefront, it was found an average 3.5±1 detector clicks per pulse for the correct challenge. The false negative rate (no click for correct challenge) was 0.6%, false positive rate (one click for wrong challenge) is 1%.

Figure 6:
FIG. 6 exemplarily shows a setting for challenge and shows detection results in form of an intensity distribution of light for a) a correct PUF and b) a wrong PUF.
Figure 6:
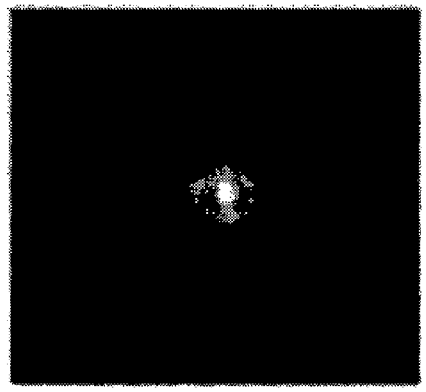
Figure 6:
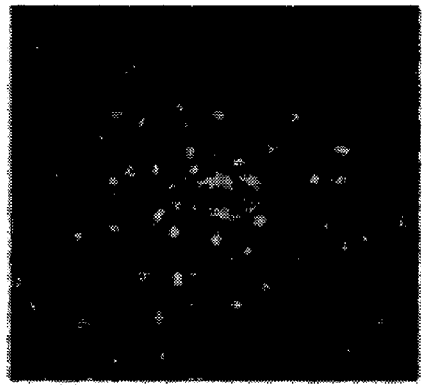

FIG. 6*a*) exemplarily illustrates a setting for a challenge sent to a PUF and FIG. 6*b*) shows the corresponding detection result for a correct PUF, whereas FIG. 6*c*) shows the detection result for a false PUF. In more detail, FIG. 6*b*) and c) show the light intensity behind the response-verifying means detected with a CCD. As can be seen, the light intensity in the (encircled) spot in the middle of the CCD is much higher in case a correct PUF is used than in the case in which a wrong PUF was presented the verifier.

The present invention for the first time provides a device and system as well as a method for verifying challenge-response pairs using a PUF being quantum secure, but at the same time avoiding problems typically arising when operating with fragile quantum states. With the help of the present invention, not only can it be determined whether the PUF presented to the verifier is the correct key, but it is in principle impossible to replace the physical PUF by an emulation means and to thereby fool the verifier. According to the disclosed invention, this security is even realized "hands-off", e.g., it is not necessary to give away the PUF for (separately) checking whether it is a real physical entity of the expected type.

The present invention will be of high importance in the field of secure communication and authorization and can in particular be applied in authorization cards or payment cards, such as credit cards. The present invention can be used in connection with the topic of quantum key exchange using a PUF in quantum cryptography protocols.

The present invention is not limited to embodiments described herein; reference should be had to the appended claims.

LIST OF REFERENCE SIGNS

1 laser pulse
2 challenge creating means (SLM)
3 challenge
4 beam splitter
5 PUF
6 response
7 response transformation means (SLM)
8 laser pulse
9 detector
10 time gating signal
11 APD signal
12 Peak
13 CCD
15 pinhole or APD
16 mirror
17 mirror
20 reference arm
30 verifier
40 box

What is claimed is:

1. A device for verifying at least one challenge-response pair, the device comprising:
 a coherent light source configured to emit coherent light;
 a challenge creating device configured to create an optical challenge to be sent to a physically unclonable function (PUF);
 a wavefront shaping device configured to perform a verification based on an optical response from the physically unclonable function (PUF), the verification being a transformation of the optical response and not a direct readout or an indirect readout;
 a detector configured to read out a result of the verification performed by the wavefront shaping device and to detect a number of photons for one challenge-response pair; and a focusing device configured to focus light exiting from the wavefront shaping device onto the detector for detection, wherein, the device is configured to distinguish a positive result for verification from a negative result for verification based on a preselected number of photons detected/detectable in the detector for the one challenge-response pair.

2. The device as recited in claim 1, wherein,
the optical challenge comprises a number of photons,
the challenge creating device comprises a setting which is described by a number of parameters, and
the number of photons in the challenge is less than the number of parameters needed to fully describe the setting of the challenge creating device so as to provide a quantum security.

3. The device as recited in claim 1, wherein the wavefront shaping device, in performing the verification of the response, performs an action which is a reversion, an inversion, or a projection so as to respectively reverse, invert, or project the response.

4. The device as recited in claim 1, wherein,
at least one of the optical challenge and the response is defined by a physical property of photons, the physical property being selected from at least one of a phase information of the photons, an amplitude information of the photons, a polarization information of the photons, a frequency information of the photons, a spatial information of the photons, and a time information of the photons, and
at least one of the challenge and the response is described by at least one of a spatial distribution of the physical property of the photons, a frequency distribution of the physical property of the photons, and a time distribution of the physical property of the photons.

5. The device as recited in claim 4, wherein the spatial distribution is a two dimensional distribution.

6. The device as recited in claim 1, wherein the challenge creating device is further configured to carry out a wavefront shaping on the coherent light.

7. The device as recited in claim 1, wherein at least one of the challenge creating device and the wavefront shaping device for the verification is/are provided as a spatial light modulator which is configured to manipulate at least one of a phase and an amplitude of light.

8. The device as recited in claim 1, wherein the coherent light source is a laser configured to emit pulses of a limited number of photons as the coherent light.

9. The device as recited in claim 1, wherein the detector is at least one of:
further configured to have a spatial detection range which is point-like; and
further configured to carry out a single photon counting.

10. The device as recited in claim 1, wherein the detector is an avalanche photodiode.

11. A system for verifying at least one challenge-response pair, the system comprising:
the device as recited in claim 1; and
a physically unclonable function (PUF) device.

12. The system as recited in claim 11, wherein the physically unclonable function (PUF) is configured to act on a basis of a light scattering either in a transmission operation mode or in a reflection operation mode.

13. A method for verifying at least one challenge-response pair, the method comprising:
emitting coherent light;
creating an optical challenge by directing the emitted coherent light onto a challenge creating device;
sending the optical challenge to a physically unclonable function (PUF) device so as to create an optical response to the optical challenge;
verifying the optical response by directing the optical response onto a wavefront shaping device for verification, the verification being a transformation of the optical response and not a direct readout or an indirect readout; and
reading out a result of the verification carried out by the wavefront shaping device with a detector,
wherein, light exiting from the wavefront shaping device is focused onto the detector for detection, the detector detects a number of photons for one challenge-response pair, and a positive result for verification is distinguished from a negative result for verification based on a preselected number of photons detected/detectable in the detector for the one challenge-response pair.

14. The method as recited in claim 13, wherein
the optical challenge comprises a number of photons,
the challenge creating device comprises a setting which is described by a number of parameters, and
the number of photons in the optical challenge is less than the number of parameters needed to fully describe the setting of the challenge creating device so as to provide a quantum security.

15. The method as recited in claim 13, wherein the reading out of the result of the verification comprises a photon counting.

16. The method as recited in claim 13, wherein the challenge creating device is configured to carry out a wavefront shaping.

17. The method as recited in claim 13, wherein the method is performed with a system for verifying at least one challenge-response pair, the system comprising:
a physically unclonable function (PUF) device; and
a device comprising:
a coherent light source configured to emit coherent light,
a challenge creating device configured to create an optical challenge to be sent to the physically unclonable function (PUF),
a wavefront shaping device configured to perform a verification based on an optical response from the physically unclonable function (PUF),
a detector configured to read out a result of the verification performed by the wavefront shaping device, and
a focusing device configured to focus light exiting from the wavefront shaping device onto the detector for detection.

18. A device for verifying at least one challenge-response pair, the device comprising:
a laser configured to emit pulses of a limited number of photons as coherent light;
a challenge creating device configured to create an optical challenge, the optical challenge comprising a number of photons to be sent to a physically unclonable function (PUF), wherein the challenge creating device is provided as a spatial light modulator which is configured to manipulate at least one of a phase and an amplitude of the coherent light, and which comprises a setting which is described by a number of parameters, wherein the number of photons in the challenge is less than the number of parameters needed to fully describe the setting of the challenge creating device so as to provide a quantum security;

a wavefront shaping device configured to perform a verification based on an optical response from the physically unclonable function (PUF), the verification being a transformation of the optical response and not a direct readout or an indirect readout, wherein the wavefront shaping device is provided as a spatial light modulator which is configured to manipulate at least one of a phase and an amplitude of the optical response;

a detector configured to read out a result of the verification performed by the wavefront shaping device and to detect an actual number of photons for one challenge-response pair; and a focusing device configured to focus light exiting from the wavefront shaping device onto the detector for detection, wherein the device is configured to distinguish a positive result for verification from a negative result for verification by a comparison of a preselected number of photons with an actual number of photons detected in the detector for the one challenge-response pair.

* * * * *